United States Patent

Gilbaugh

[11] 3,808,729
[45] May 7, 1974

[54] ANIMAL TRAP

[76] Inventor: John W. Gilbaugh, 19396 Monte Vista Dr., Saratoga, Calif. 95070

[22] Filed: Sept. 12, 1972

[21] Appl. No.: 288,422

[52] U.S. Cl. .................................... 43/88, 119/99
[51] Int. Cl. ....................... A01m 23/24, A61d 3/00
[58] Field of Search ........ 43/88, 93, 90, 80; 119/98, 119/99

[56] References Cited
UNITED STATES PATENTS

| 2,005,489 | 6/1935 | Barrett | 43/93 X |
| 2,912,715 | 11/1959 | Moss | 119/99 X |
| 2,935,966 | 5/1960 | Smith | 119/98 X |
| 3,135,240 | 6/1964 | Hickman | 119/99 |
| 3,513,812 | 5/1970 | Iverson et al. | 119/98 |

Primary Examiner—James H. Czerwonky

[57] ABSTRACT

An animal trap made in the form of a rigid frame equipped with two padded bars for capturing animals without injury by the neck. One padded bar is secured to the top and bottom of frame. An end of the other padded bar is hinged to the bottom member of the frame with the remaining end retained in an elongated opening at top of frame to keep it aligned with other padded bar as the trap is set and sprung. Near their lower extremities the padded bars are equipped with trigger mechanism parts which work in cooperation to hold trap in set position and to spring the set when trigger is activated. The hinged, padded bar is equipped with a locking device to hold it firmly against neck of captured animal to prevent escape. An elongated guide opening is provided with means to adjust space between padded bars to control pressure of hinged bar against necks of animals of varying sizes.

7 Claims, 5 Drawing Figures

PATENTED MAY 7 1974 3,808,729

ANIMAL TRAP

DESCRIPTION OF THE INVENTION

This invention relates to animal traps with novel and improved features.

An object of this invention is to provide an improved animal trap which may be economically and efficiently manufactured and which is dependable in operation.

Another object of this invention is to provide an improved animal trap provided with padded, approximately parallel bars which may be economically attached to the trap frame for capturing and holding various size animals without injury.

Another object of this invention is to provide an improved animal trap with a simple trigger mechanism that is activated when an animal reaches for bait through padded holding bars.

Another object is to provide an improved trap equipped with features to adjust space between padded holding bars to accommodate animals of different sizes.

Other and further objects of this invention will become apparent to those skilled in the art to which it relates from the following specification, claims and drawing.

In accordance with this invention there is provided an improved trap which may be efficiently and economically manufactured and which is dependable in operation.

This trap is embodied in a frame which is provided with two padded holding bar members attached approximately at the center of bottom frame member, parallel to side frame members. One padded holding bar is slideably and adjustably attached to top and bottom frame members. The second padded holding bar is hingedly attached at lower end to bottom frame member from which it extends upwardly through elongated guide opening in top frame member. The side frame members are equipped with holes for securing the trap to stationary objects in an upright position with nails, bolts or other means. A portion of the trigger mechanism shaped from flat iron is hingedly attached to each of the two padded tubular holding bars. The member of the trigger mechanism attached to the slidably mounted padded holding bar is centrally placed against a portion of the trip lever rotatably attached on the other padded tubular holding bar. The trigger mechanism is released by parts thereof working in cooperation when animal presses against trip lever when its head and neck pass between padded holding bars as it attempts to reach bait. The trap is provided with adjustable features to regulate the space between padded holding bars so it may be used to capture animals of varying sizes. The padded tubular holding bar member which is slidably attached to top and bottom frame members may be secured at desired points along top and bottom frame members by use of bolts or pins. The pivotally attached holding bar member which is activated by a coil spring may be adjusted by inserting a pin stop in holes at the desired point provided along the sides of the elongated guide opening in which said bar moves back and forth. The rotatably mounted members of the trigger mechanism may be moved upwardly or downwardly on padded tubular holding bar members to compensate for adjustments in space desired between padded holding bars.

Further details and additional features of this animal trap will be set forth in the specification, claims and drawing in which briefly:

Figure 1:
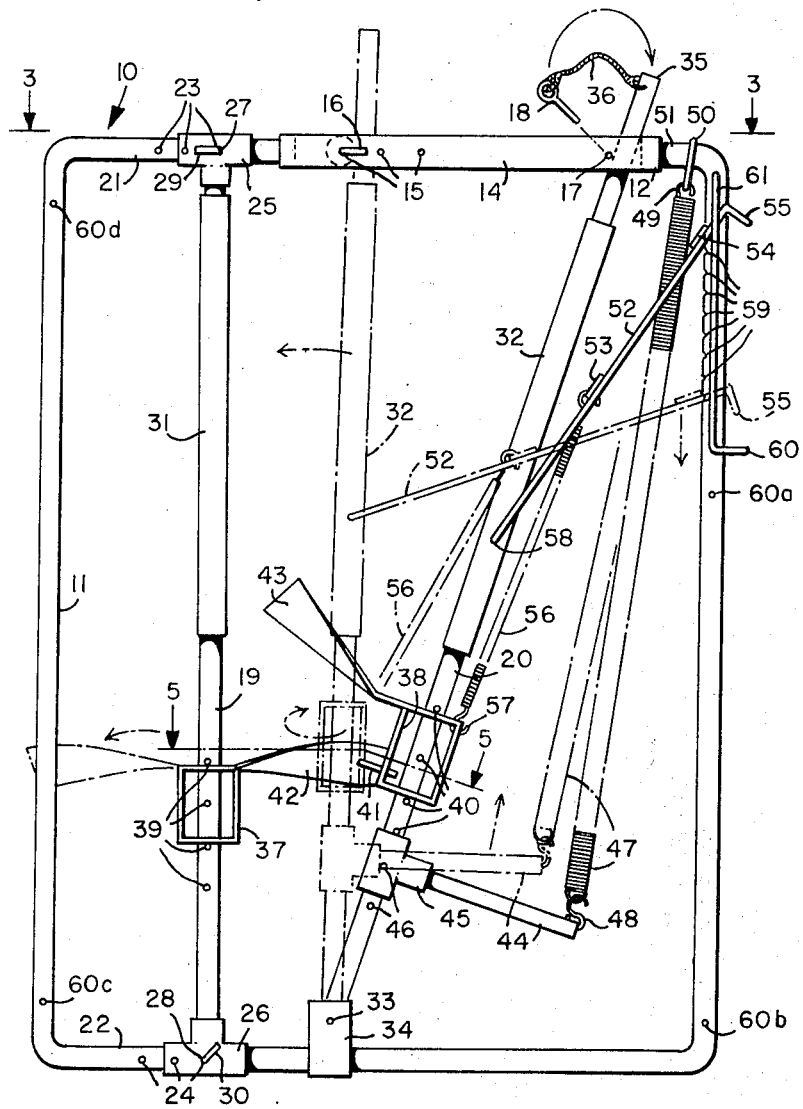
FIG. 1 is a side elevation of the embodiment of this invention.
Figure 3:
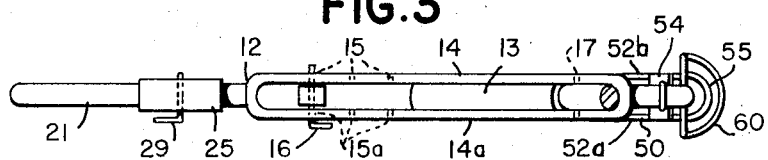
FIG. 3 is a sectional view along line 3—3 of FIG. 1.

Referring to the drawing in detail reference numeral 10 designates a frame type animal trap which is provided with segment 12 in which there is an elongated guide opening 13 as shown in FIG. 3 for receiving and controlling action of pivotally attached tubular holding bar 20. Frame member 12 has sides 14 and 14a equipped with holes 15 and 15a as shown in FIG. 3 for receiving stroke adjustment pin 16 and safety pin holes 17 into which safety pin 18 as shown in FIG. 1 is inserted as needed in setting and using the trap. The trap is equipped with two animal holding bars 19 and 20 made of tubular material. Holding bar 19 is adjustably mounted on corresponding segments of top 21 and bottom 22 frame members which contain adjustment holes 23 and 24 respectively as shown in FIG. 1. Holding bar 19 is adjustably mounted to the trap frame by T-shape tubing members 25 at the top and 26 at the bottom so that it may be slidably moved to desired position. Tubing tees 25 and 26 have holes 27 and 28 respectively which align with corresponding holes 23 at top and 24 at bottom for desired slidable adjustment of holding bar member 19. Pins 29 and 30 are inserted through holes 27 and 28 respectively when aligned with holes 23 and 24 in frame segments 21 and 22 respectively.

As shown in FIG. 1 segments of holding bars 19 and 20 are covered with thick, pliable tubing 31 and 32 respectively to cushion pressure on neck of animal held captive between holding bars.

One end of holding bar 20 is pivotly attached to bottom member of frame by a U-shap, flat iron piece 34 that is fixedly attached in near proximity to tubing tee 26 as shown in FIG. 1. The hole 35 in other end of holding bar 20 serves as a receptacle for safety pin 18 when said pin is not in use for safety purposes. Safety pin 18 is secured to holding bar 20 by a chain 36 which is fixedly attached to top of said bar.

Figure 4:
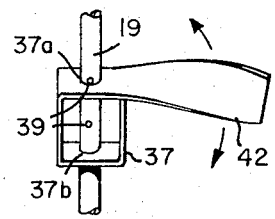
FIG. 4 is a perspective detail view of a portion of trigger mechanism taken along line 5—5 of FIG. 1.
Figure 5:
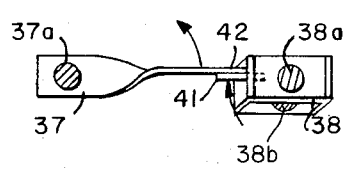
FIG. 5 is a sectional view along line 5—5 of FIG. 1.

Holding bar members 19 and 20 as shown in FIG. 1 are equipped with trigger set and release mechanisms 37 and 38 respectively which are rotatably attached in selected adjustable position as shown in FIG. 4 by pins inserted in holes 39 and 40 at top and bottom of said trigger release mechanism members respectively to prevent said trigger release mechanism from sliding upwardly or downwardly on tubular holding bars 19 and 20. Trigger release mechanism 38 is equipped with a pin 41 fixedly attached approximately in the center of front trigger release frame member which pushes trigger release mechanism lever 42 off center as shown in FIG. 5 to trip said release in cooperation with release mechanism lever 43 as shown in FIG. 1 when animal activates the trigger by pushing against trigger lever 43. Trigger levers 42 and 43 are made of flat iron bent into a configuration which permits them to cooperate in the setting and releasing of holding bars 19 and 20. Trigger release lever 42 projects along the top of the rectangular portion of trigger release mechanism 37 of which it is an integral part. Said trigger release mechanism 37 is made of flat iron and has holes 37a and 37b respectively in top and bottom of rectangular frame for pivotal mounting on holding bar 19 as shown in FIG. 4. Trigger release lever 43 projects from along the top of the rectangular portion of trigger release mechanism 38 of which it is an integral part. Said trigger release mechanism 38 is made of flat iron and has holes 38a and 38b respectively in top and bottom of rectangular frame for pivotal mounting on holding bar 20 in the same manner as trigger release mechanism is rotatably attached to holding bar 19 as shown in FIG. 4. As shown in FIG. 5, release lever 42 holds pivotal bar 20 in its open or set position.

Holding bar 20 is also equipped with a lever 44 which is slidably mounted on said holding bar by a tubular tee 45. The tubular tee is held in desired adjustable position to increase or decrease tension of coil spring 47 as shown in FIG. 1 by means of a pin inserted through holes 46 when said holes in sidewalls of tubular tee and in holding bar 20 are aligned. Lever 44 is equipped with a coil spring 47 which is fastened to said lever by an S-shaped hook 48. The other end of coil spring 47 is fastened to trap frame segment 51 by means of a hook 49 formed from the end loop of said coil spring 47.

A ring 50 which encircles trap frame segment 51 receives coil spring hook 49 to hold end of coil spring in position. The angle of tension of said coil spring 47 holds ring 50 against the end of trap frame member 12 which keeps it from sliding along frame member segment 51 as shown in FIG. 1.

Figure 2:
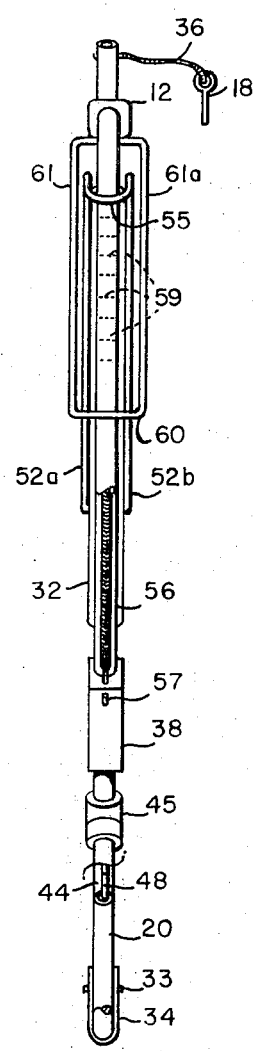
FIG. 2 is an end elevation of FIG. 1.

Holding bar 20 is provided with a U-shaped locking arm 52 as shown in FIG. 1 which is pivotally attached in holes 58 of sides of said holding bar by inwardly turned ends of sides 52a and 52b of said locking arm 52 as shown in FIG. 2. The other end 55 of locking arm 52 is bent into a downwardwardly configuration as shown in FIG. 1 for ease of lifting said arm from its locking action when removing the captured animal or resetting the trap. Said U-shaped configuration 55 on said locking arm 52 also serves as a guide for movement upwardly and downwardly of said locking arm. Said configuration 55 cooperates with holding bar 20 as said bar closes under tension of coil spring 47 and said configuration 55 slides downwardly along frame controlling the action of said locking arm.

Locking arm 52 is equipped with two flat iron plates 53 and 54 as shown in FIG. 1 which are fixedly attached to the top of members 52a and 52b which form the sides of said U-shaped locking arm 52. Plate 53 holds one end of coil spring 56 by means of a hook formed from end coil which is received in a hole in the center edge of said plate. Plate 54 is fixedly attached to the top side of side members of locking arm 52 near end 55 of said locking arm. As locking arm 52 is forced downwardly by tension of coil spring 56 during closing action of holding bar 20 and from tension by coil spring 47, plate 54 prevents locking arm 52 from moving upwardly from pressure exerted by captured animal as said plate 54 catches in notches 59 cut inside segment of the trap frame member as shown in FIG. 1 and FIG. 2.

Coil spring 56 has one end attached to plate 53 as previously described and the other end fastened by means of an S-shaped hook 57 which is received in a hole on the upper central rear side of trigger release mechanism 38. Coil spring 56 serves to keep trigger release mechanism member 38 facing toward its counterpart trigger release mechanism member 37. Said coil spring 56 also supplies the needed downward tension required for holding locking arm 52 in its downwardly locked position as shown in FIG. 1.

Side guards 61 and 61a as shown in FIG. 2 are fixedly provided along sides of frame segment to prevent interference with action of locking arm 52 from possible binding by objects to which the trap is anchored when it is in use. Guard member 60 which is bent in a semi-spherical configuration is fixedly attached in a horizontal position extending outwardly from trap frame at bottom of side guards 61 and 61a. Guard member 60 serves to prevent interference with action of end 55 of locking arm 52 by holding trap frame away from objects to which trap is anchored when in use.

The trap frame is provided with four holes 60a, 60b, 60c, and 60d laterally positioned in frame members for use in anchoring the trap with nails, bolts, or wire to objects where trap is set.

While I have shown and described a preferred form of the invention it will be understood that the invention is capable of variation in materials from which it is constructed and modification from the form shown so that the scope thereof should be limited only by the scope of the claims appended hereto.

What I claim is:

1. In an animal trap of the frame type the combination of a frame formed from bar stock or of tubing, holding bar members mounted on the inside of said frame, means attaching said holding bar members to said frame, said attaching means including pivot means for attaching one of said holding bars to said frame, control means to prevent lateral movement and adjust the length of stroke of said pivoting holding bar member, slidable adjustment means for attaching said other holding bar member to frame, rotatable trip means mounted on each of said holding bars, said last mentioned means being adapted to be actuated by an animal reaching for bait through said holding bars, said trip means rotating to release the pivotally attached holding bar when said trip means is actuated by said animal, safety means to control said pivotally attached holding bar in open position while said trip means is releasably placed in set position.

2. In an animal trap of the frame type, the combination as set forth in claim 1, further comprising means for locking the pivotally attached holding bar firmly against neck of said animal when said trip means is actuated by said animal, said locking means being pivotally attached to said pivoting holding bar and extending outwardly and looping in a U-shape configuration around frame member, the closed end of said U-shaped configuration sliding along the frame holding said locking arm on course as said arm is pulled downwardly by the closing action of said pivoting holding bar when said trip means is actuated by said animal, said locking arm being further equipped with a plate attached to top of the side members of said U-shape configuration near closed end thereof the edge of said plate being received in notches cut on the inside of said frame member preventing said locking arm from moving upwardly as said animal applies pressure in escape efforts on said holding bar to which said locking arm is pivotly attached, said frame segment around which said U-shape closed end of said locking arm is looped being smooth on the outside over which said closed end of said U-shaped locking means slides and being notched on the inward side to accommodate the edge of said plate to prevent upwardly movement from reverse pressure on said pivotally attached holding bar to prevent escape of said captured animal.

3. In an animal trap of the frame type, the combination as set forth in claim 1, further characterized by said control means of said pivoting holding bar comprising an elongated opening in the top of said frame in which the upper portion of said pivoting holding bar moves as it is set or actuated by release of said trip means, said elongated opening having pin means inserted through sides of frame top to shorten or lengthen stroke action of said pivoting holding bar which has the effect of widening or narrowing the space between the two holding bars when said trap is in its closed or sprung position, said frame top also having holes in its sides through which a second pin means is inserted as a safety feature to hold said pivoting holding bar in open position while trap is being set or to hold said pivoting holding bar in open position when trip means is actuated.

4. In an animal trap of the frame type, the combination as set forth in claim 1, further characterized by said trip means having a pin centrally and fixedly attached to the frame of one of said rotatably mounted members and which cooperates with the other rotatably mounted member by pushing said other rotatably mounted member off center to release said trip mechanism when actuated by said animal, said trip means being further provided with means for upward or downward adjustable movement on said holding bars to which they are rotatably attached, said adjustable movement providing compensation means for regulating said trip means when adjustment of said slidably attached holding bar is changed.

5. In an animal trap of the frame type, the combination as set forth in claim 1, further characterized by said pivotally attached holding bar and said locking arm being provided with coil spring tension means and means for attachment of said tension means.

6. In an animal trap of the frame type, the combination as set forth in claim 1, further characterized by said holding bars being equipped with padding means to prevent injury to said captured animal.

7. In an animal trap of the frame type, the combination as set forth in claim 2, further characterized by said frame member along which said U-shaped end of said locking means slides being equipped with guard means to prevent interference with action of said locking arm.

* * * * *